Sept. 24, 1940.　　　O. A. OKESSON ET AL　　　2,215,764
TROLLING SPOON
Filed Dec. 30, 1937

Inventors
OTTO A. OKESSON
and
ALGOT E. PERSON
By
Their Attorney.

Patented Sept. 24, 1940

2,215,764

UNITED STATES PATENT OFFICE 2,215,764

TROLLING SPOON

Otto A. Okesson and Algot E. Person,
Jamestown, N. Y.

Application December 30, 1937, Serial No. 182,619

3 Claims. (Cl. 43—45)

This invention relates to a trolling spoon and an object is to provide a novel article of this character which will more effectively lure fish by permitting light rays to penetrate the same so that there will be light below or under the spoon to attract the fish and in addition will enable the shape to be observed as a further attraction.

More specifically, the invention aims to provide a trolling spoon preferably of glass, desirably colored. A further object is to provide such a spoon as may be cast sufficiently strong and generally manufactured in practical form, expeditiously and inexpensively.

Various additional objects and advantages will become apparent from a consideration of the description following taken in connection with the accompanying drawing illustrating an operative embodiment.

Figure 1:
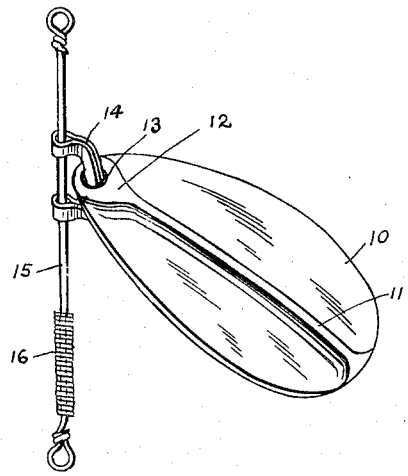
Figure 1 is a perspective view of the improved spoon and associated attaching parts.

Referring specifically to the drawing wherein like reference characters designate like or similar parts, a trolling spoon is shown at 10. This spoon is preferably of glass and is preferably colored or translucent. It may be made, however, of any equivalent material and of any desired size or shape. As shown, such spoon 10 is a single casting and is strengthened by a central longitudinal, integral rib 11, widened at one end 12, having an opening 13 therethrough by means of which it may be attached to the tackle. The rib 11 may be located wherever desired or any equivalent reinforcement employed.

As an example of operatively attaching the spoon 10 to tackle, a swivel 14 passes loosely through opening 13 and the swivel is slidably and rotatably mounted on a tie rod 15, to be connected in the fishing line. 16 designates a shock-absorbing coil spring loosely mounted on the tie rod 15.

The said spoon is light-penetrable or diaphanous, colored or translucent so that there will be light shining through and below the same as well as above, and so that the shape and color will be revealed to a fish from below. The spoon may be of a single color such as red, green, yellow, blue and black, although it may be made up of any desired shade, and variegated by the use of a plurality colors and designs and effects. The whirling of the spoon enhances the effect, reflecting the light in the direction in which the spoon travels. Actual tests and use of the improved spoon prove that it is more effective or superior to the usual opaque spoons which do not permit light to penetrate or light to be observed below them.

Figure 2:
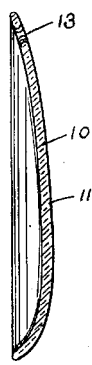
Figure 2 is a central longitudinal sectional view through the said spoon.
Figure 3:
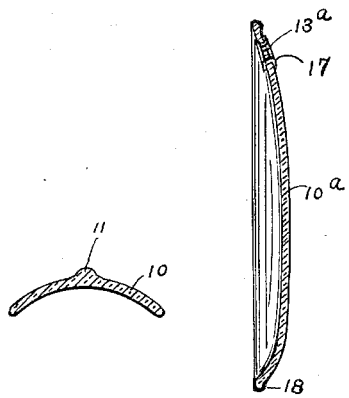
Figure 3 is a transverse sectional view through the said spoon.
Figure 4:
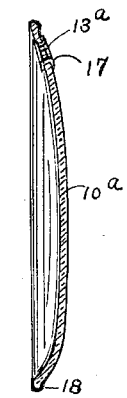
Figure 4 is a longitudinal section through a modified form.

Various changes may be resorted to provide they fall within the spirit and scope of the invention. For instance in Figure 4, a spoon 10<sup>a</sup> is shown, made of the same material as the spoon 10 of Figures 1 to 3. The opening 13<sup>a</sup> functioning like that at 13 is reinforced by a metallic ferrule 17. In addition, this spoon may be made without a rib like that at 11 in the previous form or a marginal reinforcing rib 18.

Figure 5:
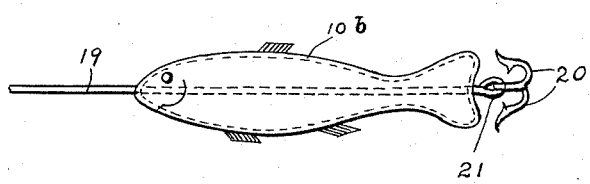
Figure 5 is an elevation of a modified form of the invention.

In Figure 5, the spoon is in the form of a minnow 10<sup>b</sup>, being of the same material as the spoons 10 and 10<sup>a</sup> so as to function similarly. Spoon 10<sup>b</sup> may be carried by a tie rod 19 having fish hooks 20 fastened at 21 to one end thereof.

We claim as our invention:

1. A fish lure for travel in the water, comprising a relatively thin spoon-like body of diaphanous material whereby light will penetrate the same and the light and shape of the lure are observable from below, the lower surface of said material being concave, and a substantially central, longitudinally extending reinforcing rib integral with the body, said rib being widened at one end and having an attaching opening extending through the same and the body.

2. A fish lure of relatively thin, spoon-like form for travel spinning in the water, said spoon being diaphanous so that light is observable from below, the lower surface of said lure being concave, the lure having an attaching opening therethrough, and a longitudinally extending rib integral with the lure through which said opening also extends.

3. A fish lure of relatively thin, spoon-like form for travel spinning in the water, said spoon being diaphanous so that light is observable from below, the lower surface of said body being concave, said body being a casting and including a substantially central, longitudinally extending rib integral therewith, said rib having a widened portion at one end, a tie member, and a swivel on the tie member passing through the widened portion.

OTTO A. OKESSON.
ALGOT E. PERSON.